Aug. 1, 1961 H. E. HULL ET AL 2,994,528
DEVICE FOR DETECTING THE FEEDING OF OVERLAPPING DOCUMENTS
Filed May 18, 1959 2 Sheets-Sheet 1
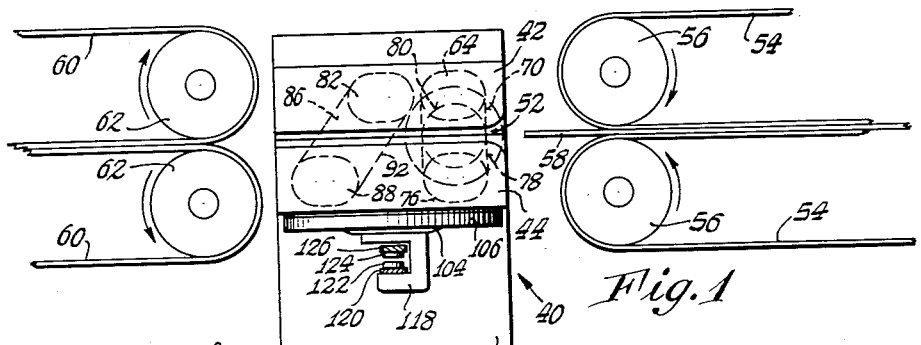
INVENTORS
HENRY E. HULL
ERNEST A. DiPASQUANTONIO
ATTORNEY
William W. Sollow Jr.

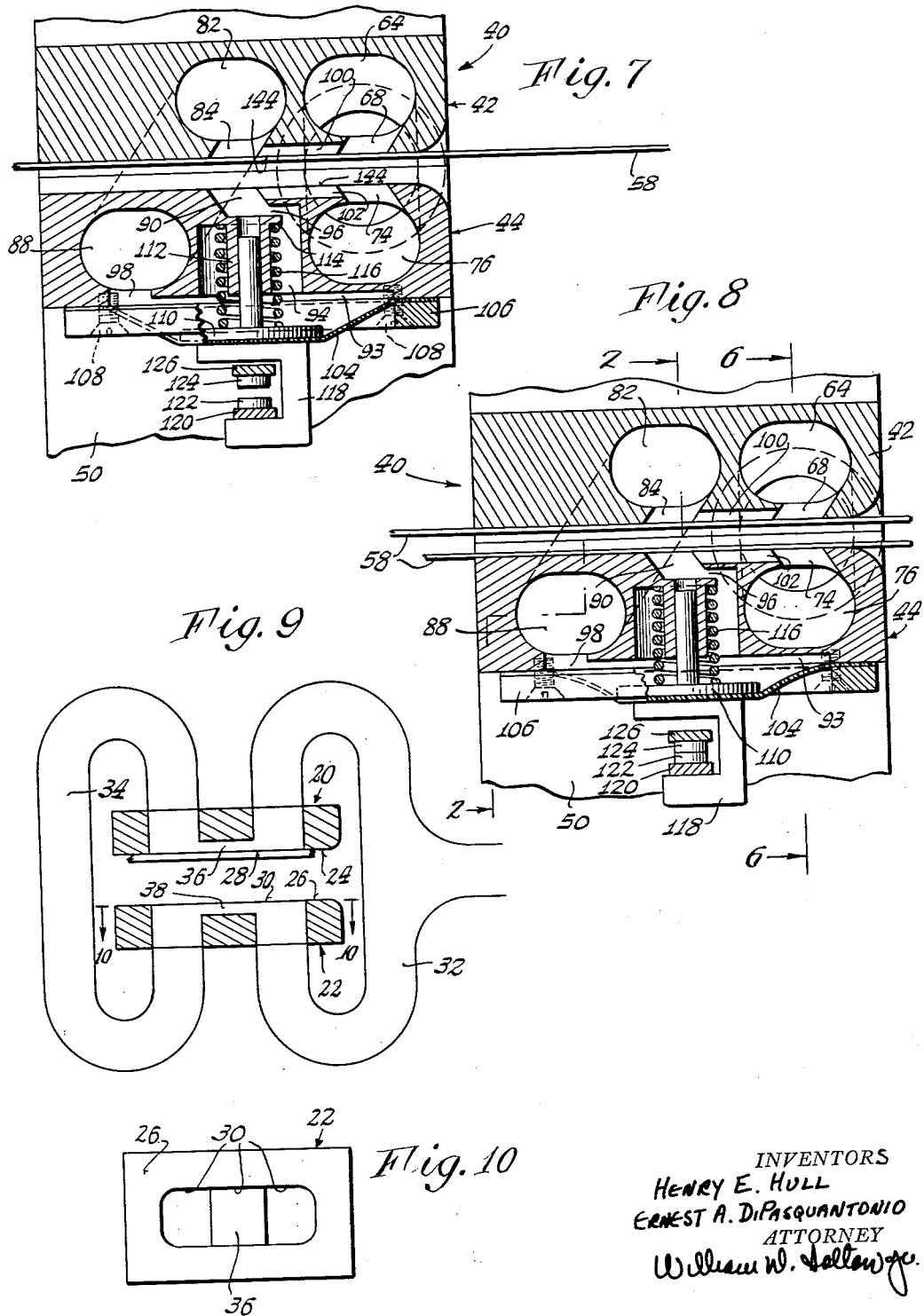

United States Patent Office 2,994,528
Patented Aug. 1, 1961

2,994,528
DEVICE FOR DETECTING THE FEEDING OF
OVERLAPPING DOCUMENTS
Henry E. Hull, Columbus, Ohio, and Ernest A. Di Pasquantonio, South Norwalk, Conn., assignors, by direct and mesne assignments, to Pitney-Bowes, Inc., Stamford, Conn., a corporation of Delaware
Filed May 18, 1959, Ser. No. 814,009
5 Claims. (Cl. 271—56)

This invention relates to an apparatus usable with or incorporating means for feeding documents in one-by-one succession, and more particularly, to such an apparatus including means for detecting the unintended feeding of two or more documents at the same time.

According to the invention, a channel is provided through which documents such as sheets, cards, letter mail, etc. are adapted to be fed in one-by-one succession. Each of two opposed, mutually spaced walls of the channel provides a port therein. The two ports are connected to each other and to a vacuum source whereby sub-atmospheric pressure prevails inwardly of both ports. When two or more documents are inadvertently fed in overlapping relation into the channel, the combination of sub-atmospheric pressure inwardly of the ports and the atmospheric pressure between the overlapped documents causes each of the overlapping documents next adjacent a port to move to and cover that port while continuing to advance through the channel. Closing off of both ports, each by one of the overlapping documents, causes a marked pressure drop inwardly of both ports. Means responsive to this marked pressure drop are provided for indicating this condition, i.e. feeding of overlapping documents. This indicating means is operatively arranged to effect deflection of the overlapping documents to a reject location or stopping of the document feeding means or otherwise. It is to be noted at this point that because the two ports are connected to each other, each of the ports, when uncovered, vents the other port. During the normal passage of documents in one-by-one succession through the channel, each document will be subject to the sub-atmospheric pressure inwardly of both ports. Due to factors such as closer proximity of an individual document to one port than to the other, each singly fed document will tend to move to and cover one of the two ports while advancing through the channel. When a singly fed document covers one of the ports, the uncovered port vents the covered port so that only a comparatively slight pressure drop occurs inwardly of either port, which pressure drop is not of sufficient magnitude to actuate the indicating means. Of course, the indicating means will not be actuated if any singly fed document should not cover either port.

Because sub-atmospheric pressure prevails inwardly of both ports when the latter are connected to each other and to a vacuum source, the path along which each uncover port vents the other port will, ordinarily, be at sub-atmospheric pressure. Accordingly, at the instant venting starts, the venting path will ordinarily be at sub-atmospheric pressure. In the manner later to be described, the embodiment of the invention disclosed herein incorporates the further feature of a venting path which is initially (when venting begins) at atmospheric pressure and which provides its venting function only when one of the ports is covered and the other port is uncovered. This is advantageous because it permits the use of a lower differential vacuum source which not only is more economical but which also effects a correspondingly smaller attraction force at each of the ports so that there is less tendency for both single and multiple documents to be retarded while being fed through the channel.

Another advantage of this improved venting feature is that a greater difference thereby results between the pressure drop inwardly of the ports when overlapping documents are fed through the channel and the pressure drop when a single document is fed through the channel. This increased difference in pressure drops permits the use of a less sensitive indicating means which has less tendency to be actuated when only one of the ports is covered, thereby ensuring that the indicating means will not be inadvertently actuated when feeding of a single document occurs.

It is accordingly an object of this invention to provide a new and improved apparatus including means for detecting the feeding of a plurality of overlapping documents.

A further object of the invention is to provide such an apparatus which requires no adjustment for the particular thickness of the documents to be fed.

Another object of this invention is the provision of such an apparatus which operates on successive documents of mixed length, width and thickness.

A further object is to provide such an apparatus capable of handling documents fed at comparatively high rates of speed and at comparatively large numbers of documents per unit time interval.

Another object of this invention is to provide such an apparatus which does not interfere with the proper feeding of documents in one-by-one succession. Yet another object is the provision of such an apparatus which is capable of detecting the feeding of plural overlapping documents without requiring stoppage or interruption of the feeding means.

Still another object of this invention is to provide such an apparatus which is capable of operation through the use of a comparatively low differential vacuum source.

A further object of the invention is the provision of such an apparatus which is dependable in operation, economical to produce and simple in construction.

Further objects and advantages will become apparent as the description proceeds.

An embodiment of the invention is shown in the accompanying drawings wherein:

FIG. 1 is a top plan view of a detecting device according to the invention along with means, shown more or less schematically, for feeding documents in one-by-one succession through a channel provided by the detecting device;

FIG. 2 is a side elevational view of the detecting device, this view being partly in section as taken along line 2—2 in FIG. 8 and showing the detecting device connected to a schematically depicted vacuum source and to a diagrammatically illustrated electrical circuit for stopping the feeding means when overlapped documents are fed through said channel;

FIG. 3 is a side elevational view partly in section and taken along line 3—3 in FIG. 2;

FIGS. 4 and 5 are views partly in section as taken respectively along lines 4—4 and 5—5 in FIG. 2;

FIG. 6 is a sectional view taken along line 6—6 in FIG. 8;

FIG. 7 is an enlarged sectional view taken along line 7—7 in FIG. 2 and showing the positions of respective parts as a single document is properly fed through said channel;

FIG. 8 is a sectional view similar to FIG. 7 but showing the positions of respective parts as two overlapping documents are fed through said channel;

FIG. 9 is a schematic, cross-sectional representation of the detecting device; and FIG. 10 is a schematic view taken along line 10—10 in FIG. 9.

The structure and function of the disclosed embodiment will now be generally described with reference to the schematic views of FIGS. 9 and 10. Two mutually spaced blocks or shoes generally designated at 20 and 22 are provided, each of which has a wall 24 and 26, respectively. Documents are adapted to be fed in one-by-one succession through the space between walls 24 and 26. Each of these walls provides a respective port 28 and 30. Ports 28 and 30 are interconnected by two passageways, one of the passageways being referred to herein as the vacuum passageway 32 and the other as the vent passageway 34. Vacuum passageway 32 extends inwardly from both of ports 28 and 30 and is connected to a vacuum source whereby sub-atmospheric pressure prevails inwardly of both ports and throughout the vacuum passageway. Vent passageway 34 extends inwardly from both ports, and atmospheric pressure prevails throughout vent passageway 34. Each of blocks 20 and 22 provides means whereby the two passageways are operatively interconnected when at least one of the ports is covered by a document and whereby the two passageways are operatively disconnected when neither of the ports is covered by a document. In this regard, block 20 provides a recess 36 which opens to port 28 and which extends between passageways 32 and 34. When port 28 is covered by a document, as shown in FIG. 9, recess 36 operatively interconnects vacuum and vent passageways 32 and 34 because recess 36 is then closed off except between the passageways. Conversely, when port 28 is not covered by a document, recess 36 is open at port 28 to the space between walls 24, 26 whereby recess 36 does not operatively connect the vacuum and vent passageways. Block 22 provides a recess 38 which functions in a manner identical to that of recess 36 in block 20. It will accordingly be apparent that when no documents are being fed through the space between walls 24, 26, vacuum passageway 32 will be at sub-atmospheric pressure and, because neither of recesses 36 and 38 then operatively connects the two passageways, vent passageway 34 will be at atmospheric pressure. When overlapping documents are fed through the space between walls 24, 26, both of ports 28 and 30 will be covered and neither port will therefore vent the other which results in a marked pressure drop to be utilized to indicate that overlapping documents have been fed. When a single document covers one of the ports (port 28, for example, as shown in FIG. 9), the other port 30, which is uncovered, vents the covered port 28 along the vent passageway 34 to the space between walls 24, 26. As noted above, the venting path along vent passageway 34 is initially at atmospheric pressure and is operatively connected to the vacuum passageway when port 28 is covered whereby the advantages noted above are realized.

A detailed description of an apparatus embodying the present invention will now be set forth with reference to FIGS. 1 through 8. The detector device according to this embodiment is generally indicated by reference numeral 40 and includes two members in the form of shoes generally designated at 42 and 44, respectively. Each of the shoes 42 and 44 provides a wall 46 and 48, respectively. A base member 50 supports shoes 42 and 44 with walls 46 and 48 in mutually spaced relation to form a channel 52 therebetween. Feeding means are provided for feeding documents such as bank checks, sheets, etc., in one-by-one succession through channel 52. Referring to FIG. 1 in this regard, the feeding means includes a first pair of opposed feed belts 54, 54 which are supported by driven pulleys 56, 56 to feed a document 58 therebetween to the left as viewed in FIG. 1 and into channel 52. A second pair of similar opposing belts 60, 60 and driven rollers 62, 62 are disposed to receive each document 58 as the latter emerges from channel 52 and to continue feeding the document in the same direction. The leading end of each document 58 enters the bite of belts 60, 60 before the trailing end of that document leaves belts 54, 54.

Referring particularly to FIGS. 6 and 7, shoe 42 provides a hollow chamber 64 which will hereinafter be referred to as a vacuum chamber. Shoe 42 also provides a port 66 in wall 46 whereby vacuum chamber 64 opens at 68 through port 66 to the space between walls 46 and 48. The lower end portion of shoe 42 has a laterally extending slot 70 which communicates with vacuum chamber 64 and which opens laterally to shoe 44 and downwardly to the adjacent portion of base 50. Shoe 44 provides a port 72, an opening 74, a vacuum chamber 76 and a slot 78, all of which are mirror-images of their counterparts as provided by shoe 42. Slots 70 and 78 open to and connect with each other whereby a passageway is provided leading from port 66, in succession through opening 68, vacuum chamber 64, slots 70 and 78, vacuum chamber 76 and opening 74 to port 72 whereby ports 66 and 72 are interconnected with each other. This passageway will hereinafter be referred to as the vacuum passageway, and it will be apparent that this passageway corresponds to the vacuum passageway 32 of the schematic arrangement of FIGS. 9 and 10. Base 50 provides a passageway 80 which communicates between slots 70, 78 and a vacuum source shown schematically in FIG. 2. With this arrangement, the vacuum source effects sub-atmospheric pressure inwardly of both ports and causes the flow of air from the space between walls 46, 48 inwardly of both ports 66 and 72, through both vacuum chambers, and along passageway 80 to the vacuum source.

Referring to FIGS. 2 and 7, shoe 42 also provides a chamber 82 which will hereinafter be referred to as a vent chamber. Vent chamber 82 opens through port 66 at 84 to the space between walls 46 and 48. The lower end portion of shoe 42 provides a slot 86 which extends laterally in an oblique direction toward shoe 44. The slot 86 communicates with vent chamber 82 and opens to shoe 44. Shoe 44 provides a vent chamber 88 which is connected, in a manner later to be described, for communication through an opening 90 to port 72 and the space between walls 46, 48. Shoe 44 also provides a slot 92 which communicates with vent chamber 88 and which extends in alignment with and connects with slot 86 of shoe 42 whereby vent chambers 82 and 88 are interconnected with each other.

The manner in which vent chamber 88 is connected for communication through opening 90 to port 72 and the space between walls 46 and 48 will now be described. Referring to FIG. 7, the outboard side of shoe 44 has a circular recess or counterbore 93. An annular bore 94 extends inwardly of shoe 44 from counterbore 93 and terminates short of wall 48. An arcuate slot 96 (see FIGS. 5 and 7) provides access between opening 90 and bore 94. As also shown in FIGS. 5 and 7, an arcuately shaped slot 98 provides communication between vent chamber 88 and counterbore 93. With this arrangement a passageway is provided extending, as best shown in FIGS. 2 and 7, from port 72, in succession through opening 90, arcuate slot 96, bore 94, counterbore 93, arcuate slot 98, vent chamber 88, slots 92 and 86, vent chamber 82 and opening 84 to port 66. The passageway just described will hereinafter be referred to as the vent passageway, and this vent passageway corresponds, of course, to the vent passageway 34 of the schematically shown device in FIGS. 9 and 10.

Means now to be described are provided for operatively connecting the vacuum and vent passageways when one of ports 66 and 72 is covered by a document. In this regard, shoe 42 has a plurality of recesses 100 therein which open at port 66 to the space between walls 46, 48 and which communicate with vacuum chamber 64 and vent chamber 82 through openings 68 and 84, respectively. Shoe 44 provides a plurality of recesses 102 which are mirror-images of recesses 100. Recesses 102 open at port 72 to the space between walls 46, 48 and communicate through openings 74 and 90 with vacuum chamber 76 and vent chamber 88, respectively. When a singly fed document covers port 66, recesses 100 will be closed off from the space between walls 46 and 48 and consequently will operatively interconnect vacuum and vent chambers 64 and 82 whereby the vacuum and vent passageways will be operatively interconnected. Correspondingly, when a single document covers port 72, recesses 102 will operatively interconnect vacuum and vent chambers 76 and 88 whereby the vacuum and vent passageways will be operatively interconnected. Accordingly, whenever a singly fed document covers either of ports 66, 72, the covered port and the vacuum passageway will be vented by the uncovered port and the vent passageway. When neither of ports 66, 72 are covered, the vacuum and vent chambers of each shoe will be operatively disconnected (and consequently the vacuum and vent passageways will be operatively disconnected) because both sets of recesses 100 and 102 are then open to the space between walls 46 and 48. When both of the ports are covered, neither port can vent the other.

Referring particularly to FIGS. 2, 3 and 7, the means for effecting indication of the feeding of overlapping documents will now be described. Counterbore 93, which opens to the outboard side of shoe 44, is closed off by a flexible diaphragm 104 which is secured about its radially outer margin to shoe 44 by means of a clamping ring 106. Clamping ring 106 is tightened down with screws 108 extending through the clamping ring, through the diaphragm and into threaded engagement with tapped holes in shoe 44. The head of plunger 110 is secured, as by cementing, to the central portion of diaphragm 104. The shank of plunger 110 rides in and is guided for movement by a sleeve 112. Sleeve 112 provides a shoulder 114 against which one end of a compression spring 116 abuts. The other end of spring 116 bears against the head of plunger 110 whereby the plunger and the central portion of diaphragm 104 are normally biased outwardly to the position shown in FIG. 7. Counterbore 93, annular bore 94, and the remaining space outside the confines of shoe 44 but inwardly of diaphragm 104 can be considered as another chamber which will hereinafter be referred to as the diaphragm chamber. Upon a drop in pressure of sufficient magnitude within the diaphragm chamber, atmospheric pressure outside the diaphragm chamber will cause inward deflection of the diaphragm and plunger 110 from the position shown in FIG. 7 to that shown in FIG. 8. As the diaphragm chamber returns to atmospheric pressure, spring 120 acts to effect outward deflection of diaphragm 108 to the normal position as shown in FIG. 7.

A substantially U-shaped hook 118 is secured, as by cementing, to the outer surface of diaphragm 104 opposite the head of plunger 110. One portion of hook 118 bears against a contact-carrying member 120 which is formed of resilient material and which mounts a movable electrical contact 122, the latter cooperating with another electrical contact 124 to provide a pair of normally-open contacts. Contact 124 is supported by a contact-carrying member 126, and both of contact-carrying members 120 and 126 are supported in cantilever fashion by a block 128 formed of one of the conventional electrical insulating materials. Insulating block 128 is supported, in turn, by shoe 44 by means of screws 130. A screw 129 threadedly engages an extension of block 128 to adjust the gap between contacts 122 and 124. When diaphragm 104 deflects inwardly from the position shown in FIG. 7 to that shown in FIG. 8, hook 118 moves contact-carrying member 120 to effect closing of contacts 122 and 124. As shown in FIG. 2, contacts 122 and 124 are electrically connected to effect stopping of the motive means which drives the document feeding means. In this regard extensions 132 and 134 of contact-carrying members 120 and 126, respectively, are electrically connected by leads 136 and 138 to the terminals of a relay 140 having normally-closed contacts. When contacts 122 and 124 are closed, relay 140 will be energized to open its contacts thereby to open-circuit a motor 142 which constitutes the prime mover for the document feeding means.

In operation, the vacuum source effects sub-atmospheric pressure inwardly of both of the ports 66 and 72 and within the vacuum passageway, the latter extending from port 66 in shoe 42, in succession through opening 68, vacuum chamber 64, slot 70, slot 78, vacuum chamber 76 in shoe 44 and opening 74 to port 72 in shoe 44. When no documents are being fed through the space between walls 46, 48, atmospheric pressure prevails throughout the vent passageway, the latter extending from port 66 in shoe 42, in succession through opening 84, vent chamber 82, slot 86, slot 92, vent chamber 88, arcuate slot 98, counterbore 93, annular bore 94, arcuate slot 96 and opening 90 to port 72 in shoe 44. When single documents are fed in one-by-one succession through the space between walls 46, 48, they will tend to cover one of the two ports 66, 72 due to the sub-atmospheric pressure inwardly of both ports. When a single fed document 78 covers port 66 as shown in FIG. 7, recesses 100 operatively connect vacuum chamber 64 with vent chamber 82 whereby the vacuum and vent passageways are interconnected with the result that the uncovered port 72 and the vent passageway vent the covered port and the vacuum passageway along a path initially at atmospheric pressure. Consequently, no drop in pressure within the vent passageway occurs of sufficient magnitude to cause deflection of diaphragm 104 to contacts-closed position. When a singly fed document covers the other port 72, recesses 102 operatively connect vacuum chamber with vent chamber whereby the vent and vacuum passageways are interconnected and diaphragm 104 will not be deflected to contacts-closed position because port 66 and the vent passageway will then vent port 72 and the vacuum passageway along a path initially at atmospheric pressure. If a singly fed document should not cover either of the ports 66, 72 diaphragm 104 will, of course, not be deflected to contacts-closed position. It will be apparent, then, that feeding of documents in one-by-one succession through the space between walls 46, 48 will not be effective to cause closing of contacts 122, 124. When two or more documents are inadvertently fed simultaneously into the space between walls 46, 48, the combination of sub-atmospheric pressure inwardly of both ports and atmospheric pressure between the overlapped portions of the documents causes each of the overlapping documents next adjacent a port to cover that port whereby both of ports 66 and 72 are covered. When both ports are covered, neither of the ports nor the vent passageway vents the other port or the vacuum passageway. The result is a sudden and marked drop in pressure inwardly of both ports and throughout the vent passageway, the latter including both of vent chambers 82, 88 and the diaphragm chamber. This pressure drop within the diaphragm chamber is significantly greater than that which can occur when only single documents are fed through the space between walls 46, 48 and is of sufficient magnitude to deflect diaphragm 104 to contacts-closed position. Closing of contacts 122, 124 by deflection of the diaphragm is effective to open-circuit the motor 142 which drives pulleys 56, 56 and 62, 62 whereby the document feeding means is stopped.

It will be noted that the diaphragm chamber of the embodiment as shown in FIGS. 1–8 is operatively disconnected from the vacuum passageway except when one or both of ports 66 and 72 is closed. Consequently, the diaphragm chamber, as well as the rest of the venting passageway, will not be subject to subatmospheric pressure except when one or both ports are covered.

Another advantage of the instant invention is that it is capable of effecting the indicating function without stopping or otherwise deleteriously affecting the feeding of documents through the space between walls 46, 48. For example, detector device 40 could be divorced from the feeding means shown in FIG. 1 and incorporated in an arrangement such as that disclosed in copending U.S. patent application Serial No. 705,296 to W. J. Hanson et al., filed December 26, 1957. This would involve electrically connecting leads 136, 138 of FIG. 2 through appropriate time-delay means if necessary, to one of the solenoids designated at 74 in this copending application, whereby the associated deflecting element designated at 63 in this copending patent application would deflect overlapping documents to a reject location. The solenoid 74, deflecting element 63, and the structure associated therewith as disclosed in this copending patent application are incorporated herein by reference.

As is apparent from FIGS. 5, 7 and 8, the hollow interior of sleeve 112 within which the shank of plunger 110 rides, is open to the vent passageway at the end opposite that adjacent the head of the plunger. An advantage of this is that the plunger 110 does not work against a gradually increasing pressure head as would be the case if said opposite end of sleeve 112 were closed.

Another advantage of the embodiment of the invention as disclosed herein is that it is capable of operating with a comparatively low differential vacuum source. Merely by way of illustration, when the detector device as disclosed in FIGS. 1–8 was operated with a vacuum source at a pressure of between one and two inches of mercury less than atmospheric pressure, very satisfactory performance was obtained. The feature of a low differential vacuum source leads to the advantage that the feeding of overlapped documents through the space between walls 46, 48 is not stopped or otherwise deleteriously effected. This same feature coupled with the improved venting feature as described herein results in very little and no deleterious retardation of documents as they are fed through the space between walls 46, 48.

It will be apparent that within the practical limits for which a given device according to the instant invention is designed, no adjustment is required for the particular thickness of the documents to be fed; and, again within practical limits, such a given device operates on successive documents of mixed thickness as well as of mixed width and length.

It will be clear that multiple documents need not entirely overlap each other to be detected by a device embodying the invention. Rather, the fed documents need overlap along a length sufficient only to cover both ports for the very short time interval required to effect deflection of the diaphragm 104 to contacts-closed position. It will also be clear that more than two overlapping documents will be detected by the device 40 in the same manner that two are detected.

The detector device 40 as described above is of particular utility when the successively fed documents are spaced from each other in the direction of feed. This spacing provides a time interval between the feeding of successive documents, and the vent passageway returns to atmospheric pressure during each of these time intervals. Consequently, the vent passageway will be at atmospheric pressure before the feeding of each of the successively fed documents. It is to be recognized, however, that the detector device 40 is effective to provide its intended functions when the documents are stream-fed, i.e. fed with no spacing between the successive documents in the direction of feed. Stream feeding of the documents would permit very little, if any, opportunity for the vent passageway to return to atmospheric pressure between the feeding of successive documents. However, even with stream-feeding, the pressure inwardly of both ports will be substantially less when both ports are covered than that when at least one of the ports is uncovered. This is the case because no venting occurs when both ports are covered whereas each port, when uncovered, vents the other port. This lower pressure when both ports are covered would be effective to indicate the feeding of documents which overlap along the sufficient length noted above.

Each of the recessed portions by which operative interconnection of the vacuum and vent chambers of each shoe 42, 44 is effected as described above, takes the form of a plurality of comparatively narrow recesses rather than a single recess of width substantially equal to the sum of the narrow recesses because lands 144 intermediate the respective narrow recesses provide support for each fed document against wrinkling, buckling, etc. For the same purpose, the portions of ports 66 and 72 exclusive of that at recesses 100 and 102, respectively, are filled with grillwork which is flush with respective walls 46, 48. This grillwork has been omitted from the drawings in order to avoid unduly complicating the same.

Dimensions of certain of the parts as shown in the drawing have been modified for the purposes of clarity of illustration.

Since many changes could be made in the embodiment of the invention as particularly described and shown herein without departing from the scope of the invention, it is intended that this embodiment be considered as exemplary and that the invention not be limited except as warranted by the following claims.

What is claimed is:

1. A device for detecting the feeding of a plurality of overlapped documents; said device providing a pair of mutually spaced opposed walls between which documents are adapted to be fed in one-by-one succession; each of said walls having a port therein; said device further providing a first passageway extending from both of said ports and adapted to be connected to a vacuum source to effect sub-atmospheric pressure inwardly of both ports; said device further providing a second passageway extending from each of said ports to the other port; said second passageway, when both of said ports are uncovered, being at atmospheric pressure and, when only one of said ports is covered by a single document being fed through the space between said walls, providing a venting path from the covered port to the uncovered port; and means for indicating the feeding of a plurality of overlapping documents in response to the pressure drop occurring inwardly of said ports when both ports are covered by overlapping documents fed through the space between said walls.

2. A device for detecting the feeding of a plurality of overlapping documents; said device comprising a pair of members spaced from each other for the feeding of documents therebetween in one-by-one succession; said device providing a first passageway opening at one end through each of said members to the space between said members, said first passageway being adapted for connection to a vacuum source to effect subatmospheric pressure therewithin; a second passageway opening at one end through each of said members to the space between said members; each of said members providing a recessed portion open to the space between said members and communicating between said first and second passageways whereby either of the recessed portions, when a document is fed into said space between the members and covers that recessed portion and the end of both of said passageways provided by said one member, operatively connects said passageways for venting of said first passageway by said second passageway; and means for indicating the feeding of a plurality of overlapping documents in response to the pressure drop occurring within said second passageway when both of said recessed portions and both of the ends of both of said passageways are covered by overlapping documents fed into the space between said walls.

3. A device for detecting the feeding of a plurality of overlapped documents; said device comprising a pair of members spaced from each other for the feeding therebetween of documents in one-by-one succession; each of said members having a port therein opening to the space between said members; each of said members providing a vacuum chamber and a vent chamber therein; both of the chambers in each of said members communicating with the port therein; said vacuum chambers being adapted for connection with a vacuum source to effect sub-atmospheric pressure within the vacuum chambers; said vent chambers being interconnected with each other; each of said members providing a recessed portion defined, in part, by the port therein and communicating with both of the chambers therein whereby the recessed portion of one of said members, when single documents are fed through the space between said members and cover the port of said one member, operatively connects the vent and vacuum chambers of said one member to effect venting of the covered port; and means for indicating the feeding of overlapped documents in response to the pressure drop within said venting chambers when overlapping documents are fed through the space between said members and cover both of said ports.

4. The device as set forth in claim 3 wherein said means includes a flexible diaphragm; and wherein one of said members provides a third chamber in communication with said vent chambers whereby the pressure in said third chamber remains equal to that in said vent chambers; said third chamber being defined, in part, by said diaphragm; said means further including a pair of electrical contacts operatively associated with said diaphragm for actuation by deflection of the latter in response to said pressure drop when both of said ports are covered.

5. In combination; a pair of mutually spaced shoes; means for feeding documents in one-by-one succession through the space between said shoes; each of said shoes having a port therein opening to the space between said shoes; each of said shoes providing a vacuum chamber connected to vacuum source means to effect sub-atmospheric pressure within both of the vacuum chambers; each of said shoes providing a vent chamber; the vent chambers being interconnected with each other; at least one of said shoes further providing a recessed portion defined, in part, by the port of that shoe and communicating with both of the chambers of the respective shoe whereby said recessed portion, when said feeding means feeds a single document through the space between said shoes and that document covers the port of that shoe, operatively connects tthe vacuum and vent chambers of that shoe to effect venting of the covered port; and means for indicating the feeding of overlapped documents by said feeding means; said means being responsive to the drop in pressure within said venting chambers upon both of said ports being covered by the overlapped documents.

References Cited in the file of this patent

UNITED STATES PATENTS

| 1,823,182 | Wright | Sept. 14, 1931 |
| 2,729,448 | Backhouse | Jan. 3, 1956 |
| 2,812,941 | Tebbs | Nov. 12, 1957 |

FOREIGN PATENTS

| 143,139 | Sweden | Dec. 1, 1953 |